United States Patent [19]
De Gioia et al.

[11] 3,784,268
[45] Jan. 8, 1974

[54] BEARING SEAL

[75] Inventors: Peter A. De Gioia, Sandusky;
Charles B. Sutton, Port Clinton,
both of Ohio

[73] Assignee: General Motors Corporation,
Detroit, Mich.

[22] Filed: Dec. 22, 1972

[21] Appl. No.: 317,373

[52] U.S. Cl. ............................ 308/187.2, 277/25
[51] Int. Cl. ............................................. F16c 33/78
[58] Field of Search ................... 308/187.1, 187.2, 308/36.4; 277/25

[56] References Cited
UNITED STATES PATENTS
3,627,390  12/1971  Irwin ............................... 308/187.1
3,414,341  12/1968  Murphy ........................... 308/187.2
3,554,621  1/1971  McAllister ....................... 308/187.2

FOREIGN PATENTS OR APPLICATIONS
1,327,643  4/1963  France ............................. 308/187.2
1,466,935  12/1966  France ............................. 308/187.2

*Primary Examiner*—Charles J. Myhre
*Assistant Examiner*—Barry Grossman
*Attorney*—W. S. Pettigrew et al.

[57] ABSTRACT

A needle roller package bearing disposed on the end of a shaft has a combined nylon separator-seal. The seal element is connected to the separator element by a thin annular web and is provided with flyweights to enhance sealing efficiency during operation of the bearing.

4 Claims, 5 Drawing Figures

PATENTED JAN 8 1974 3,784,268
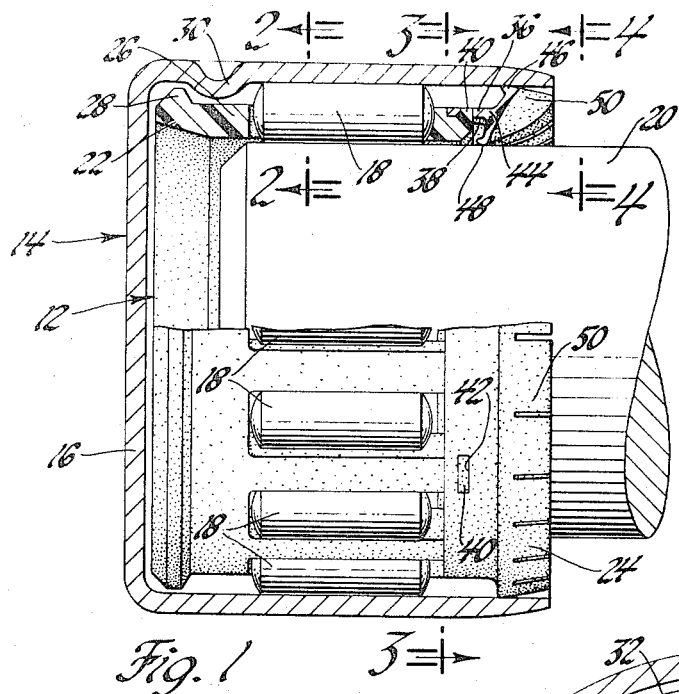
Fig. 1
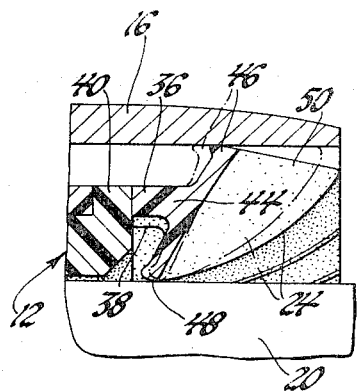
Fig. 1a
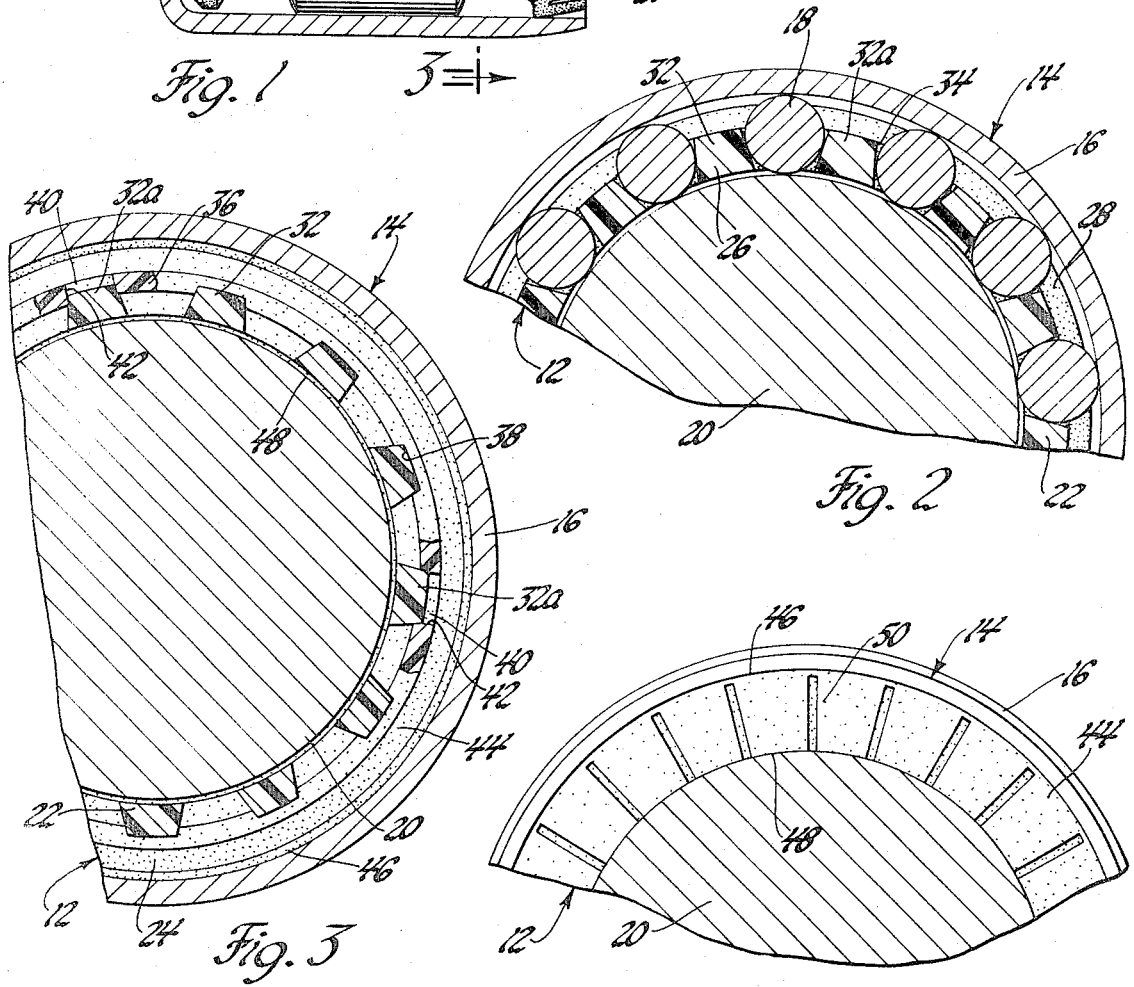
Fig. 2
Fig. 3
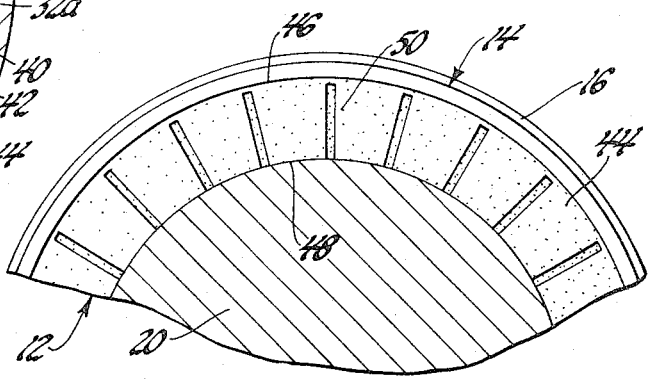
Fig. 4

BEARING SEAL

This invention relates generally to bearing seals and more specifically to bearing seals combined with separators.

Bearing seals combined with separators to reduce the rubbing pressure between the sealing edges of the seal and the bearing race members are already known as, for instance, shown in the Australian specification No. 227605 published Feb. 26, 1958 for "Improvement In Or Relating To Anti-Friction Bearings" and the French Pat. No. 1.327.643 granted Apr. 8, 1963 for "Sealing Means For Roller Bearings Having A Cage." However, as far as applicants are aware, all known combined separator-seals share one common fault in that the plastic sealing element (usually nylon) depends on an initial interference fit to maintain seal pressure. The seal pressure is lost along with the sealing efficiency as soon as the wear equals the amount of the interference fit. In addition, most of the known separator-seals are designed so that an increase in temperature tends to crush the seal surface against the outer race member and thus repeated temperature cycles cause the seals to loose elasticity and take a permanent set which deteriorates the sealing efficiency.

Accordingly, it is an object of our invention to provide an improved sealing element for a combined separator-seal which accommodates wear on the sealing surfaces of the seal element.

A further object of our invention is to provide an improved sealing element for a combined separator-seal which can undergo repeated temperature cycles without appreciably affecting the sealing efficiency of the seal.

Another object of our invention is to provide an improved sealing element for a combined separator-seal in which the centrifugal force resulting from the bearing rotation acts as a restoring force to maintain sealing pressure even after a moderate amount of seal wear has occurred.

Another object of our invention is to provide an improved sealing element of a semi-rigid material of inherent lubricity, such as nylon, which is resiliently distortable under the influence of centrifugal force to maintain a sealing pressure between both of the sealing surfaces of the seal and the relatively rotatable race members of a bearing.

The exact nature of this invention as well as other objects and advantages thereof will be readily apparent from consideration of the following specification relating to the annexed drawing in which:

FIG. 1 is a side sectional view of an improved combined separator-seal in accordance with our invention incorporated into a needle roller package bearing disposed on the end of a shaft.

FIG. 1a is an enlargement of a portion of FIG. 1 showing the sealing of the open end between the bearing cup and the shaft.

FIG. 2 is a section taken along the line 2—2 of FIG. 1 showing the relationship of the separator element of the combined separator-seal to the other components of the needle roller package bearing and the shaft.

FIG. 3 is a section taken along the line 3—3 of FIG. 1 showing the mechanical interconnection between the separator and seal elements of the combined separator-seal.

FIG. 4 is a section taken along the line 4—4 of FIG. 1 showing an end view of the combined separator-seal from the seal end.

Referring now to the drawing and more specifically to FIG. 1, a combined separator-seal 12 in accordance with our invention is illustrated in conjunction with a needle roller package bearing 14 comprising a drawn metal cup 16 with a retained complement of circumferentially spaced rollers 18 for directly journalling the end of a shaft 20 inserted into the open end of the bearing.

The separator-seal 12 comprises a separator element 22 and a seal element 24 separately molded from a nylon or other semi-rigid, synthetic organic polymeric material having a high lubricity characteristic. Where appropriate, reinforcing filler material, such as fiberglass, may be used in varying amounts to adjust the rigidity and strength of each of the elements.

The separator element 22 has a single end ring 26 provided with a circumferential ridge 28 which has an interference fit with three circumferentially spaced dimples 30 in the drawn cup 16. The separator element 22 although rather rigid has sufficient resilience permitting the ridge 28 to be snapped past the dimples 30 into the position shown in FIG. 1 where the rigid 28 holds the combined separator-seal 12 in the bearing cup 16.

The separator element 22 further comprises axially extending fingers 32 and 32a on the end ring 26 which define the side surfaces of the roller pockets 34 (see FIG. 2). The cross section of the major portion of the fingers 32 and 32a is identical and is such that the roller pockets 34 diminish in width in the radially inward direction and prevent the rollers 18 from dropping through the pockets 34 in the absence of the shaft 20. Preferably the fingrs 32 are sufficiently resilient to permit the rollers 18 to be snapped into the roller pockets 34 from the inside of the combined separator-seal 12 after it is assembled to the bearing cup 16.

The end portions of the fingers 32 are undercut on their outer diameter and fit in axial slots 38 on the inside of a thin cylindrical web 36 of the seal element 24. The three equally circumferentially spaced fingers 32a have their end portions transversely slotted to prevent integral hooks 40 on their ends. The web 36 has three radial slots 42 matching the outline of the hooks 40 which communicate with the axial slots 38 which receive the ends of the fingers 32a. The fingers 32a are sufficiently resilient so that when the ends of the fingers 32 and 32a are inserted into the axial slots 38 the ends of the fingers 32a are cammed radially inwardly until the hooks snap into the slots 42 mechanically interconnecting the separator element 22 and seal element 24. The elements 22 and 24 could alternatively be connected by other suitable means such as a simple bonding of the parts or they could be molded as one integral piece if the identical material were satisfactory for both elements.

The seal element 24 further comprises a generally annular funnel shaped body 44 having enlarged circumferential rims at its inner and outer diameters respectively. These enlarged rims have rounded sealing surfaces 46 and 48 which sealingly engage the shaft 20 and the drawn cup 16 to close the open end of the annular space between the drawn cup 16 and the shaft 20. The web 36 is integrally attached to the funnel shaped body 44 at the mid portion of the body 44 and merges smoothly with the outer radially inclined surface of the funnel shaped body. The body 44 is oriented so that the outer radially inclined surface faces the separator element 22 and the sealing surface 48 at the inner diameter of the body is nearer to the rolling elements 18 than the sealing surface 46.

The seal element 24 also includes a large number of flyweights 50 which may conveniently be provided by molding a large triangular shape annulus integral with the funnel shaped body 44 and then separating the annulus into several discrete flyweights by radial cuts extending to the inner radially inclined surface of the funnel shaped body 44. The flyweights 50 should be sufficient in number and closely spaced so that when the seal element 24 is rotated during operation of the bearing each flyweight tilts an incremental portion of the body 44 toward a more upright position with the web 36 acting as a flexural pivot because of its thinness. The tilting of an incremental portion of the body 44 under the influence of centrifugal force acting on a flyweight is indicated in the dotted line position shown in FIG. 1a. The flyweights are also spaced very close together so that the portions of the funnel shaped body 44 between the flyweights 50 are also carried into a tilted position and effectively tilt the entire funnel shaped body 44 into a more upright position thereby applying a sealing pressure between the sealing surfaces 46 and 48 and the drawn cup 16 and the shaft 20 respectively. While the exact number and spacing of the flyweights 50 may be varied, we have found that a seal element having a nominal outer diameter of .881 inch can be suitably provided with 24 incremental flyweights 50 spaced apart about 0.015 inch.

In order to function properly the total mass of the flyweights 50 must exceed that of the funnel shaped body 44. It is also preferable that the flyweights 50 are attached to the full radial extent of the body 44 and have their centers of mass located at the greatest radial distance from the axis of the bearing and displaced axially from the end of the funnel shaped body as much as practical. This increases the twisting effect on the incremental funnel shaped body portions about the flexurally pivotal web 36 as the separator-seal is subjected to centrifugal force during the operation of the bearing.

The seal element 24 is made from a semi-rigid material and does not depend upon the flexibility of the sealing surfaces to effect good sealing characteristics. Rather the sealing edges are substantially rigid and provide the sealing by a slight interference fit between the cup and the shaft 20 so that the material used in the sealing element should be softer than the drawn metal cup 16 and have good inherent lubricity characteristics. In operation then, as the separator 22 and rollrs 18 rotate substantially at the intermediate speed between the relative speeds of the cup and the shaft the seal element is also driven at this speed. The centrifugal force acting on the flyweights 50 tilt the funnel shaped body 44 of the seal element toward a more upright position thereby producing a sealing pressure between both of the sealing surfaces 46 and 48 and the drawn metal cup 16 and the shaft 20 respectively by a wedging type action. This action produced by centrifugal force compensates for any wear on the sealing surfaces or any differential thermal expansion between the seal element 24 and the metal parts of the bearing.

While an improved sealing element in accordance with our invention has been illustrated in connection with a blind ended needle roller package bearing which requires only a single seal, our invention is equally applicable to other types of bearings. For instance, our improved sealing element can be combined with separators in ball bearings, cylindrical bearings and tapered roller bearings. Furthermore in those instances where both ends of the bearing require sealing, an improved sealing element in accordance with our invention is connected to each end of the separator to completely seal the bearing.

Therefore, we wish it to be understood that we do not desire to be limited to the exact details of construction shown and described, for the above and other obvious modifications will occur to a person skilled in the art.

We claim:

1. In a combined separator-seal for circumferentially spacing a plurality of antifriction elements disposed in an annular space between a pair of relatively rotatable race members on an antifriction bearing, an improved seal element for closing one end of said annular space comprising, a generally annular, funnel shaped semi-rigid body having an inner and an outer surface and circumferential sealing end surfaces for sealingly engaging said relatively rotatable race members respectively, a thin annular web connecting a mid portion of said body to a separator with said outer surface of said body facing said separator, and a plurality of flyweights attached to said body having their centers of mass spaced from said inner surface away from said separator for forcing said sealing end surfaces into pressure engagement with said race members respectively under the influence of centrifugal force when said seal element is driven by said separator and said antifriction elements during operation of the bearing.

2. In a combined separator-seal for circumferentially spacing a plurality of antifriction elements disposed in an annular space between a pair of relatively rotatable race members of an antifriction bearing, an improved seal element for closing one end of said annular space comprising, a generally annular, funnel shaped semi-rigid body of generally uniform thickness having an inner and an outer surface and enlarged end portions having rounded circumferential sealing surfaces for sealingly engaging said relatively rotatable race members respectively, a thin annular integral web on said body merging with said outer surface at a mid portion of said body, means connecting a free end portion of said integral web to a separator, and a plurality of incremental, closely circumferentially spaced integral flyweights extending from said inner surface of said body away from said separator for forcing said sealing surfaces into pressure engagement with said race members respectively under the influence of centrifugal force when said seal element is driven by said separator and said antifriction elements during operation of the bearing.

3. In a combined separator-seal for circumferentially spacing a plurality of antifriction elements disposed in an annular space between a pair of relatively rotatable race members on an antifriction bearing, an improved seal element of semi-rigid, synthetic organic polymeric material for closing one end of said annular space comprising, a generally annular, funnel shaped body having an inner and an outer radially inclined surface and circumferential sealing end surfaces for sealingly engaging said relatively rotatable race members respectively, a thin annular web connecting a mid portion of said body to a separator with said outer radially inclined surface facing said separator, and a plurality of incremental, closely spaced flyweights attached to said inner radially inclined surface of said body, said flyweights having a mass greater than the mass of said body and extending radially inwardly and outwardly beyond said web for forcing said sealing end surfaces into pressure engagement with said race members respectively under the influence of centrifugal force when said seal element is driven by said separator and said antifriction elements during operation of the bearing.

4. The improved seal element as defined in claim 3 wherein said flyweights are triangularly shaped and integrally connected with said funnel shaped body at the inner radially inclined surface thereof, said triangularly shaped flyweights extending for substantially the entire radial extent of said funnel shaped body and having their wider ends disposed radially outwardly.

* * * * *

PO-1050
(5/69)

UNITED STATES PATENT OFFICE
CERTIFICATE OF CORRECTION

Patent No. 3,784,268          Dated January 8, 1974

Inventor(s) Peter A. DeGioia and Charles B. Sutton

It is certified that error appears in the above-identified patent and that said Letters Patent are hereby corrected as shown below:

Col. 1, line 6, "pressure" should read -- speed --.

Col. 2, line 25, "rigid" should read -- ridge --;
          line 36, "fingrs" should read -- fingers --;
          line 44, "prevent" should read -- provide --.

Signed and sealed this 23rd day of April 1974.

(SEAL)
Attest:

EDWARD M. FLETCHER, JR.          C. MARSHALL DANN
Attesting Officer                 Commissioner of Patents